United States Patent
Bettoni

(10) Patent No.: US 9,641,030 B2
(45) Date of Patent: May 2, 2017

(54) METHODS OF MANUFACTURING ROTORS HAVING INTERFERING SINTERED MAGNETS AND CARBON FILAMENT SHEATHS FOR ELECTRIC MOTORS

(71) Applicant: MAVEL S.r.l., Pont Saint Martin (AO) (IT)

(72) Inventor: Davide Bettoni, Pont Saint Martin (IT)

(73) Assignee: IFP ENERGIES NOUVELLE3, Rueil-Malmaison (FR)

( * ) Notice: Subject to any disclaimer, the term of this patent is extended or adjusted under 35 U.S.C. 154(b) by 504 days.

(21) Appl. No.: 14/031,681

(22) Filed: Sep. 19, 2013

(65) Prior Publication Data

US 2014/0084733 A1 Mar. 27, 2014

(30) Foreign Application Priority Data

Sep. 25, 2012 (IT) ............... MI2012A1592

(51) Int. Cl.
  *H02K 15/03* (2006.01)
  *H02K 1/27* (2006.01)
(52) U.S. Cl.
  CPC ............. *H02K 1/27* (2013.01); *H02K 1/2733* (2013.01); *H02K 15/03* (2013.01); *Y10T 29/49012* (2015.01)
(58) Field of Classification Search
  CPC ........ H02K 15/03; H02K 15/12; H02K 15/16; H02K 1/27; H02K 1/28
  USPC ................. 29/596, 598; 310/156.28, 156.31, 310/216.066, 216.067
  See application file for complete search history.

(56) References Cited

U.S. PATENT DOCUMENTS

| | | | |
|---|---|---|---|
| 4,930,201 A * | 6/1990 | Brown ................... | H02K 1/278 310/156.28 |
| 5,735,038 A | 4/1998 | Sakashita et al. | |
| 6,047,461 A * | 4/2000 | Miura .................... | H02K 15/03 310/156.28 |

(Continued)

FOREIGN PATENT DOCUMENTS

| | | |
|---|---|---|
| JP | H08-126234 A | 5/1996 |
| JP | 2009-148019 A | 7/2009 |

OTHER PUBLICATIONS

Italian Search Report for IT MI2012A 001592 dated Jul. 5, 2013.

*Primary Examiner* — Michael Andrews
(74) *Attorney, Agent, or Firm* — Harness, Dickey & Pierce, P.L.C.

(57) ABSTRACT

A method of manufacturing an electric-motor rotor may include providing a magnet of sintered magnetic material, the magnet having a first diameter; providing a sheath of composite material, the sheath having an inner diameter smaller than the first diameter; reducing the first diameter to a second diameter; fitting the sheath onto the magnet when the magnet has the second diameter; and letting the magnet with the sheath fitted thereon to interfere, allowing the sheath to exert inward pressure on the magnet. An electric-motor rotor may include a magnet of sintered magnetic material, the magnet having a first diameter; and a sheath of composite material, the sheath having an inner diameter smaller than the first diameter. The sheath may be associated with the magnet in such a way that the magnet with the sheath fitted thereon interfere so that the sheath exerts inward pressure on the magnet.

18 Claims, 7 Drawing Sheets

(56) References Cited

U.S. PATENT DOCUMENTS

| | | | | |
|---|---|---|---|---|
| 2003/0062789 A1* | 4/2003 | Stuart | .................... | H02K 15/03 |
| | | | | 310/156.48 |
| 2007/0278883 A1* | 12/2007 | Marcenaro | ......... | H02K 15/0012 |
| | | | | 310/90 |
| 2008/0124235 A1* | 5/2008 | Honkura | .................. | H02K 1/17 |
| | | | | 310/43 |
| 2009/0284093 A1* | 11/2009 | Shiao | .................... | H02K 1/278 |
| | | | | 310/156.22 |

* cited by examiner

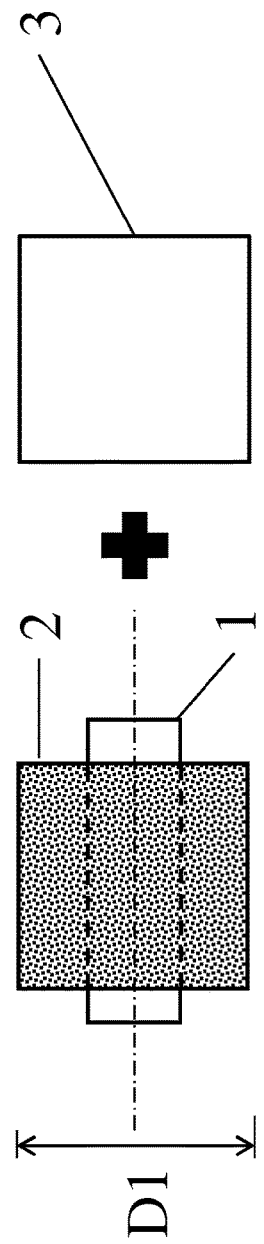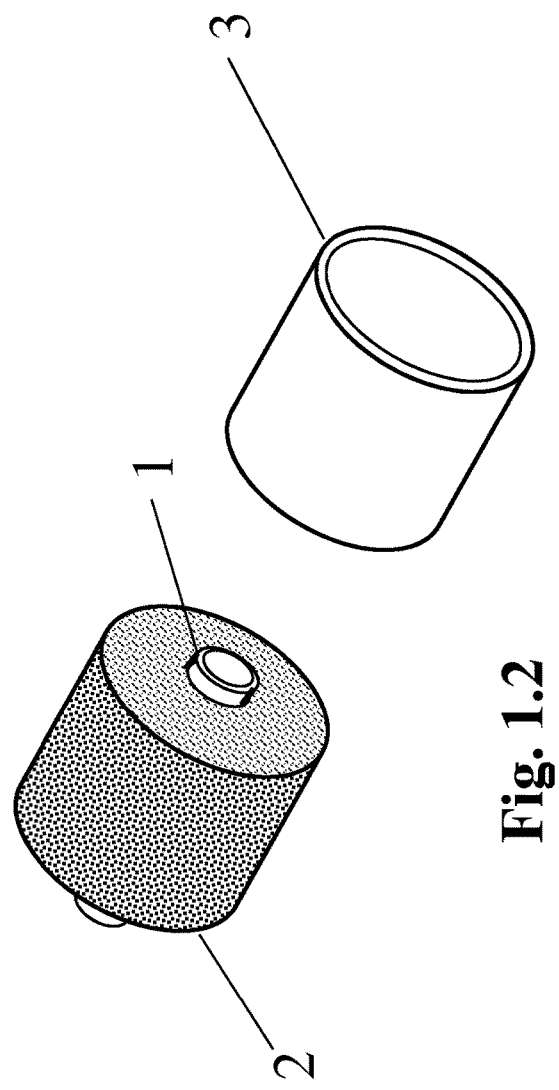
Fig. 1.1
Fig. 1.2

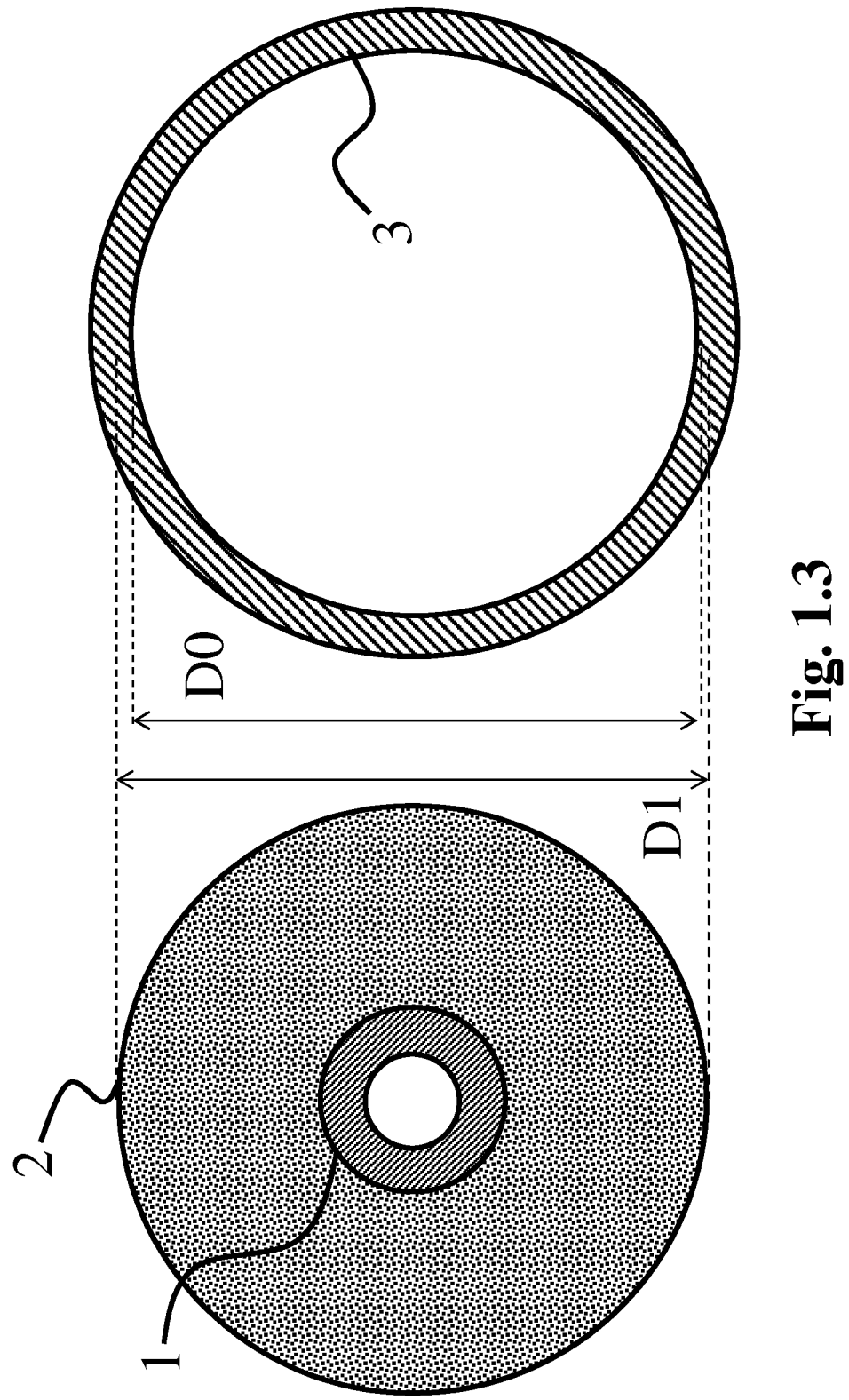
Fig. 1.3

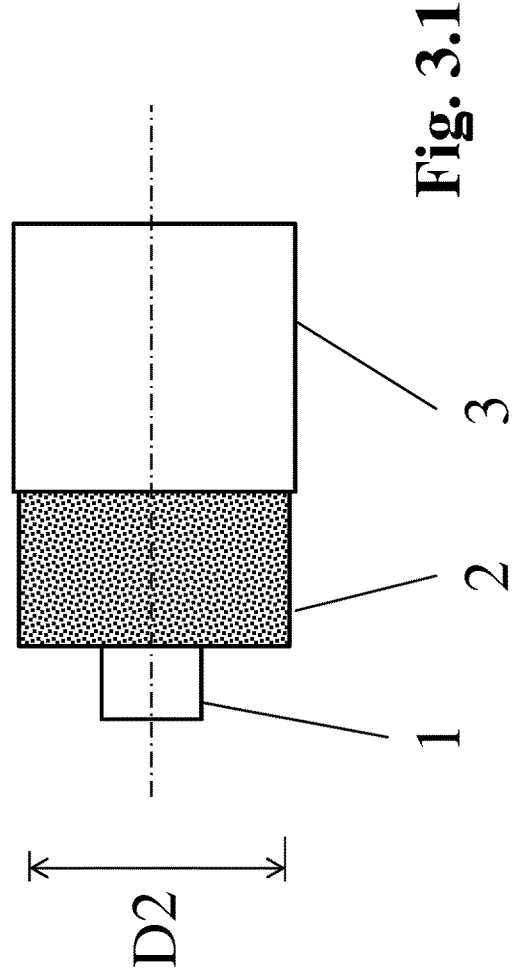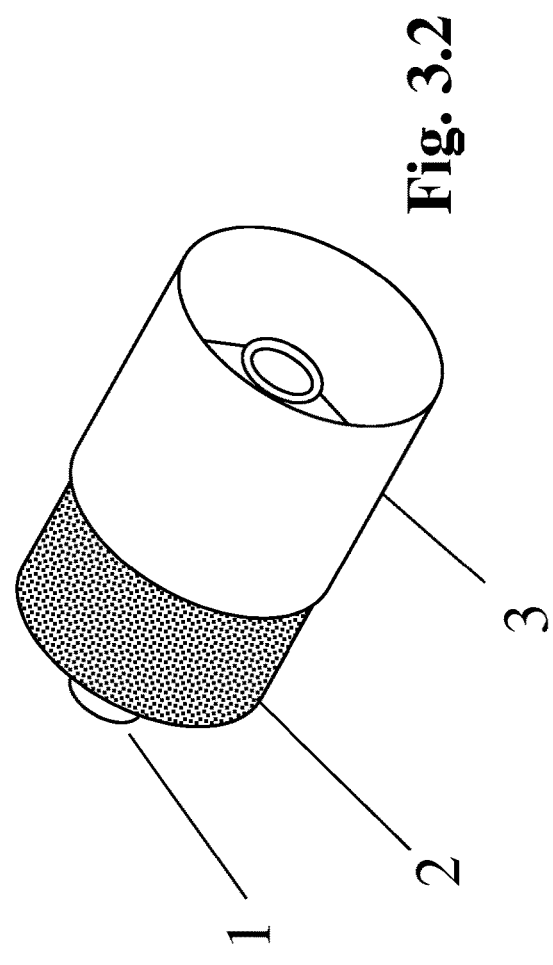
Fig. 3.1
Fig. 3.2

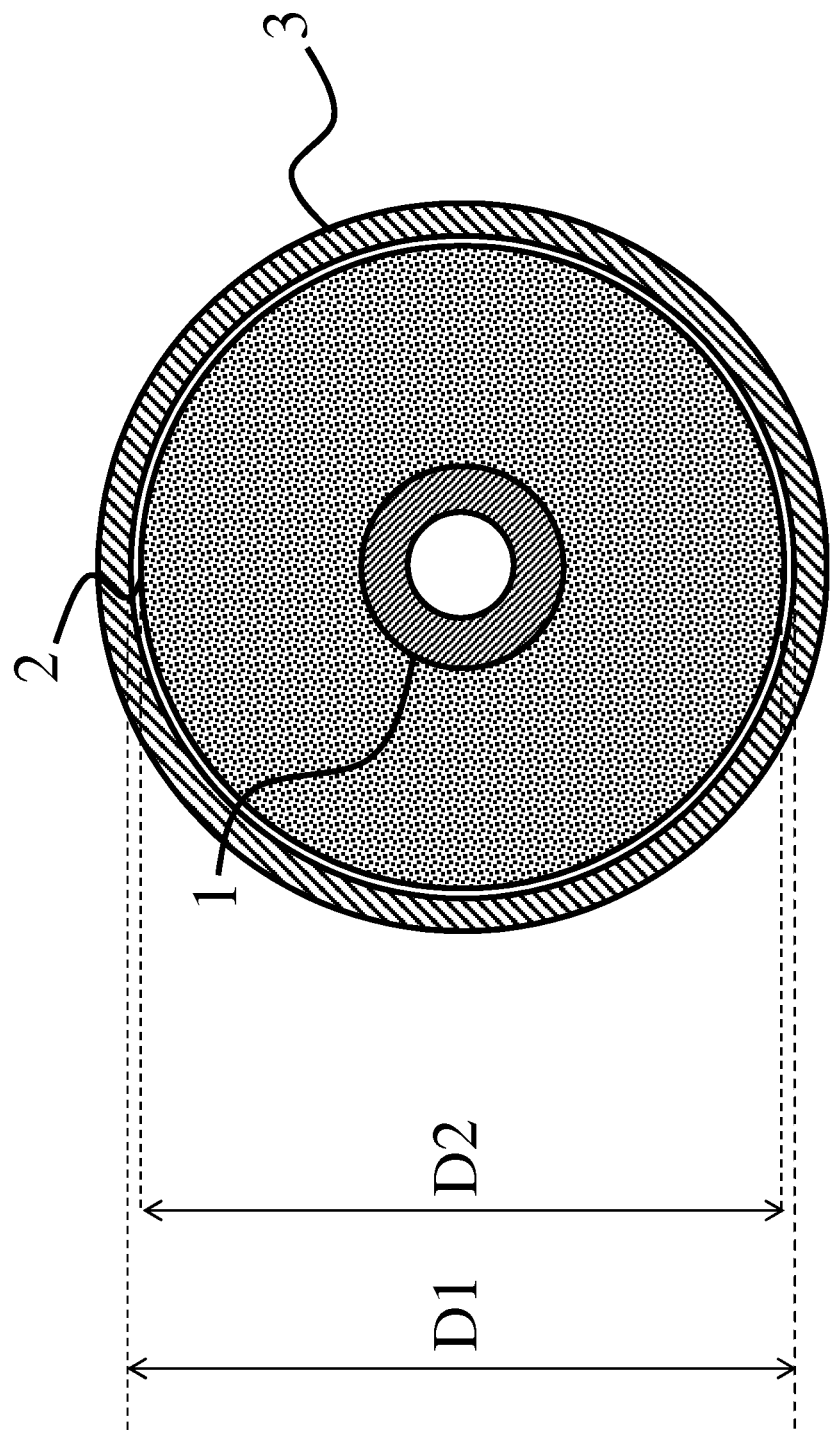
Fig. 3.3

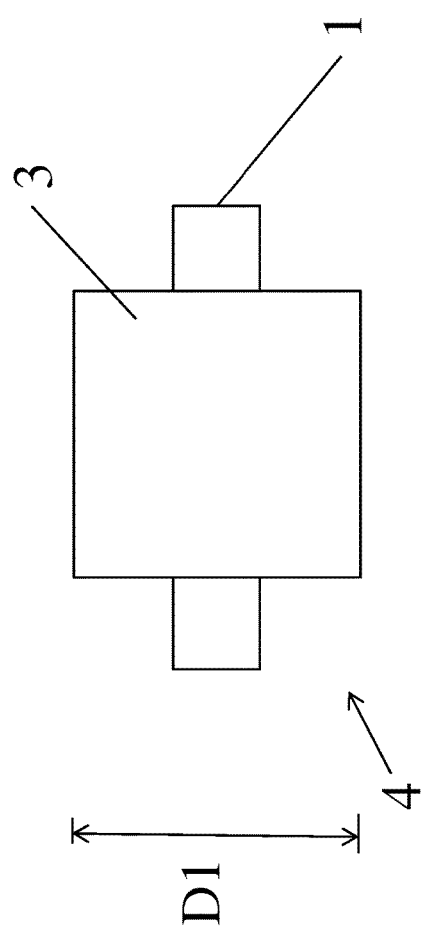
Fig. 4.1
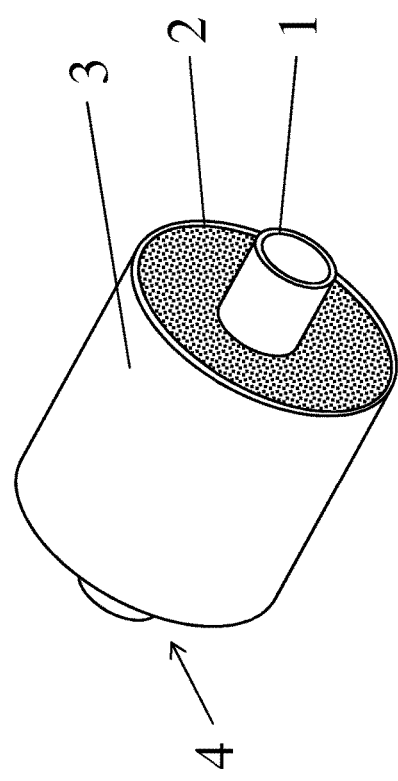
Fig. 4.2

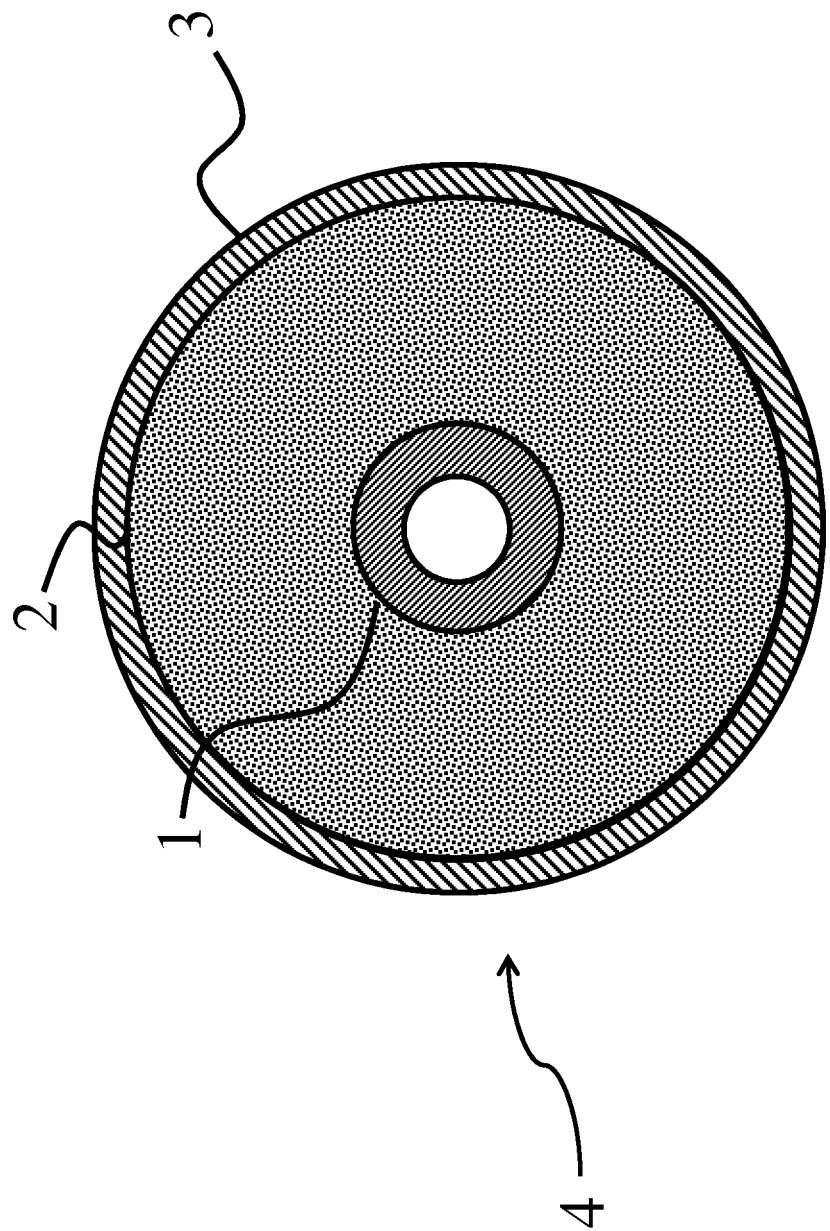
Fig. 4.3

METHODS OF MANUFACTURING ROTORS HAVING INTERFERING SINTERED MAGNETS AND CARBON FILAMENT SHEATHS FOR ELECTRIC MOTORS

CROSS-REFERENCE TO RELATED APPLICATION(S)

This application claims priority under 35 U.S.C. §119 from Italian Patent Application No. MI2012A 001592, filed on Sep. 25, 2012, in the Italian Patent and Trademark Office, the entire contents of which are incorporated herein by reference.

FIELD OF APPLICATION

The present invention relates to a rotor for electric motors.

More particularly, the present invention relates to a rotor for synchronous electric motors.

Even more particularly, the present invention relates to a rotor for synchronous electric motors of the permanent-magnet type with a high peripheral speed.

The present invention also relates to a method of manufacturing the said rotor.

BACKGROUND

As is well known, in the electrical engineering sector, the term "rotor" is used to define the drive shaft of an electric motor. The rotor, in a machine with moving parts, is the set of rotating parts situated opposite the stator which is the stationary part.

It is known to construct rotors using sintered materials.

The sintering process consists in compacting and transforming materials reduced to powder form into a unified composition; this treatment is performed at a temperature lower than the melting point of the material.

The characteristic property of a component made by means of sintering is the extreme hardness of the component, together with the corresponding low cost in the case of mass-production.

In this way, cores made of magnetic materials with a high magnetic permanence are obtained. Although sintered materials have a good compressive strength, a limiting drawback consists in the very poor tensile strength; this is due to the nature itself of the sintered materials which are not obtained by means of fusion, but by means of compaction of powders.

In synchronous electric motors, in particular high-speed permanent-magnet motors, the rotor is subject to centrifugal forces (perpendicular to the external surface of the rotor itself) which tend to break the rotor, exerting tensile forces which cannot be withstood, resulting potentially in complete destruction thereof.

Usually these forces are opposed by materials which are suitably wound around the rotor, called banding tapes, which, by limiting expansion of the magnet due to the centrifugal forces, exert a pressure on the magnetic material, so as to prevent destruction thereof.

For such an application in motors characterized by rotational speeds of more than 50,000 rpm, usually a composite material, e.g. carbon fiber, is used (this because of its good non-magnetic, electrical and mechanical properties), said material being wound onto the rotor and compacted using special resins.

Although carbon fiber has good mechanical properties, there is nevertheless a maximum limit of the tensile forces which such a fiber is able to exert on the rotor; the amount of this force varies depending on the diameter of the yarn used to prepare the banding tape.

In fact, considering that the centrifugal force exerted by the magnet on the fiber increases with the square of the angular velocity, it is clear that, with an increase in the latter, the forces to be opposed by the fiber become increasingly greater, until conventional banding systems become inadequate since the elasticity of the banding is such that it cannot withstand the forces of the magnet and therefore is unable to prevent breakages due to the tensile loads of the magnet itself.

The technical problem is to provide a rotor with a banding system which pre-compresses the magnet and does not result in it being subjected to major tensile loads, but only compressive loads.

SUMMARY OF THE INVENTION

The present invention provides a method of manufacturing a rotor for an electric motor, comprising the steps of:
a) providing a magnet made of a sintered magnetic material, said magnet having a first diameter;
b) providing a radial holding sheath made of a composite material, for example carbon fiber, said sheath having an inner diameter which is smaller than the said first diameter;
c) reducing said first diameter of said magnet to a second diameter;
d) fitting said radial holding sheath onto said magnet when said magnet has the second diameter;
e) letting the cylindrical magnet with the sheath fitted thereon interfere, thus allowing the sheath to exert inward pressures on the cylindrical magnet;

Preferably, the step c) of reducing the first diameter of the magnet comprises the step of lowering the temperature of the magnet.

In one embodiment, the step of lowering the temperature comprises the step of dipping the magnet into a fluid at a low temperature. This low temperature may be lower than about −120° C.

In one embodiment, the fluid is liquid nitrogen or the like.

The step of fitting the radial holding sheath onto the cylindrical magnet is carried out substantially without mechanical interference or with very little interference.

The step e) may comprise the step of heating the cylindrical magnet and the sheath fitted thereon at room temperature.

The step b) of providing a radial holding sheath made of composite material, for example carbon fiber which is a material with very small thermal expansion values, may comprise forming a cylindrical radial holding sheath on a chuck and taking the sheath off the chuck.

According to another aspect, the present invention provides an electric motor, comprising: a magnet of a sintered magnetic material, said cylindrical magnet having a first diameter; a radial holding sheath, for example made of carbon fiber, said sheath having an inner diameter which is smaller than the first diameter; wherein said holding sheath is associated with said cylindrical magnet in such a way that the cylindrical magnet with the sheath fitted thereon interfere so that the sheath exerts an inward pressure on the cylindrical magnet even when the rotor is not rotating. The electric motor also comprises a stator.

The main advantage of the invention is that the magnetic material is greatly compressed both in the "rest" condition of the rotor and at nominal speed when the centrifugal force opposes the compressive forces imparted by the banding, producing a resultant force at the magnet/composite material (for example carbon fiber) interface which continues to keep the magnet compressed, preventing therefore tensile forces incompatible with the sintered material.

The invention will be described in detail with embodiments provided by way of non-limiting examples with reference to the accompanying drawings.

BRIEF DESCRIPTION OF THE DRAWINGS

FIG. 1.1 is a schematic side-plan view of a cylindrical core mounted on a central shaft and a radial holding sheath to be fitted onto the cylindrical core;

FIG. 1.2 is an axonometric view of the components of FIG. 1.1;

FIG. 1.3 is an enlarged cross-sectional view of the components shown in FIG. 1.1;

FIG. 3.1 is a schematic side-plan view of the step in which the sheath is fitted onto the cylindrical magnet;

FIG. 3.2 is an axonometric view of the step shown in FIG. 3.1;

FIG. 3.3 is an enlarged cross-sectional view of the step shown in FIG. 3.1;

FIG. 4.1 is a schematic side view of the rotor according to the invention;

FIG. 4.2 is an axonometric view of the rotor of the invention; and

FIG. 4.3 is an enlarged cross-sectional view of the rotor according to the invention.

DETAILED DESCRIPTION

Figure 2:
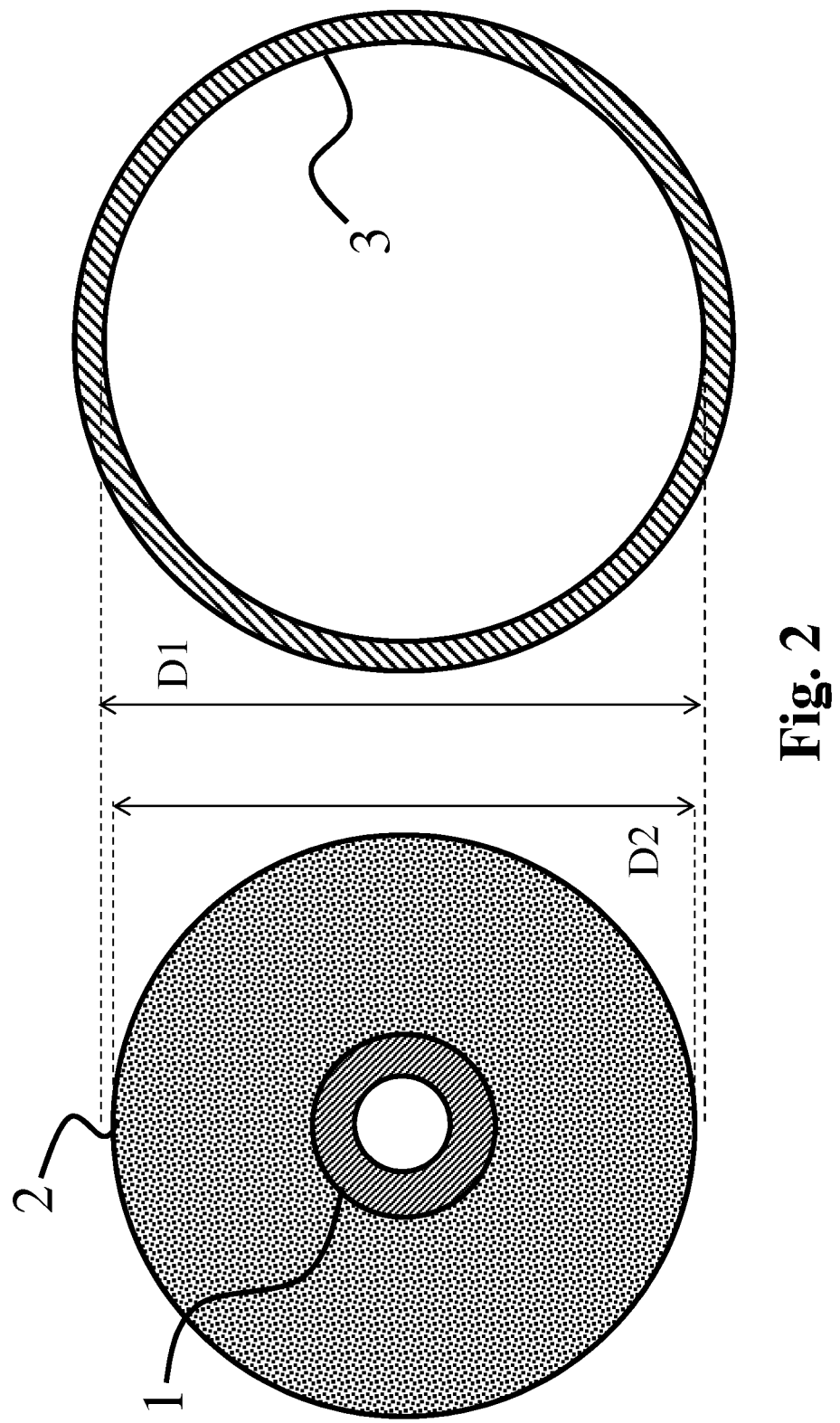
FIG. 2 is an enlarged cross-sectional view of the cylindrical magnet, mounted on the central shaft, the cylindrical magnet having a smaller diameter so that the sheath may be fitted thereon.

The invention relates to a method of manufacturing a rotor 4 for an electric motor. The electric motor is not shown, but is an electric motor of the known type, for example a brushless electric motor. The electric motor typically also comprises a stator not shown in the various figures.

The method comprises the initial step of manufacturing a cylindrical magnet 2 of sintered material mounted on a shaft 1. The shaft 1 may be in the form of a hollow shaft of metallic material, for example steel.

FIG. 1.1 shows the shaft 1 and the magnet 2 mounted thereon. The right-hand part of FIG. 1 also shows a radial holding sheath. The sheath 3 forms a closed, annular, banding strip which, once mounted, exerts a pressure on the sintered magnet 2 made of magnetic material. This pressure is reduced as a result of the centrifugal force during high-speed rotation so as to prevent it from being deformed and/or destroyed. The pressure exerted by the sheath against the magnetic material opposes the high pressure due to the centrifugal force at a high/very high speeds of rotation.

The sheath 3 is typically formed by winding a filament (or a plurality of filaments) around a chuck. Preferably, the sheath 3 comprises carbon filaments. The wound arrangement of filaments may be typically fixed in position by means of a layer of resin or other similar material. The sheath 3 thus forms a hollow cylinder, as also shown in FIG. 1.2.

The cylindrical magnet 2 made of sintered material is constructed so as to have an outer diameter D1 greater than the inner diameter D0 of the sheath 3, as shown schematically in FIG. 1.3.

The size of the thickness of the sheath 3 of carbon fiber (or other composite material) must be determined depending on the nominal rotational velocity of the rotor and the rotor diameter: the maximum tractional force exerted on the fiber yarn—and therefore the choice of the thickness of the banding—are, in fact, dependent on these parameters.

According to the invention, the holding sheath 3 is associated with the cylindrical magnet 2 so that this magnet exerts on the sheath a radial thrust directed inwards when the rotor 4 is not rotating.

Advantageously, according to the invention, the magnetic material is therefore greatly compressed in the "rest" condition of the rotor.

Subsequently, according to the invention, the initial diameter D1 of the cylindrical core 2 is reduced from the initial value to a second value D2<D1.

In FIG. 2, the difference between the values D1 and D2 has been accentuated for greater illustrative clarity; however, as will be explained further below, the difference between D1 and D2 is, in reality, very small.

Advantageously, according to the invention, the reduction in diameter of the cylindrical magnet from D1 to D2 is performed by means of lowering of the temperature of the magnet 2.

In other words, the method according to the invention makes use of the different thermal expansion constant of the carbon fiber, iron and magnet as well as the good tensile strength of the carbon fiber and the good compressive strength of the sintered magnet.

Preferably, the reduction in the temperature envisages dipping the magnet 2 in a low-temperature fluid.

When subjected to a low temperature, the rotor as a whole (shaft and pole shoe with similar thermal expansion properties) contracts and the diameter is reduced. The reduction is generally comprised between 0.1 and 0.2%, for example about 60 µm for a diameter of 40 mm.

In order to obtain the results described, the temperature must be, for example, lower than −120° C. or −150° C.

According to the invention, the fluid used to perform this lowering of the temperature is liquid nitrogen or similar fluids.

Once the temperature has been reduced and consequently the diameter of the magnet 2 reduced from the value D1 to the value D2, the sheath 3 may be fitted onto the cylindrical magnet 2 without substantially exerting any force.

In other words, the method according to the invention envisages a step of fitting the radial holding sheath 3 onto the magnet 2 when the magnet has the second diameter D2 (smaller than D1). When the magnet and the sheath are fitted onto each other, the diameter D2 is smaller than or the same as the diameter D0, the inner diameter of the sheath 3.

Advantageously, according to the invention the step of fitting the sheath 3 is performed substantially without mechanical interference.

In fact, advantageously, according to the invention, the fitting process is performed by means of thermal interference of the carbon fiber banding on the magnetic rotor made of sintered material (namely making use of the different thermal expansion coefficients of the carbon fiber and magnet).

During the next step of the method according to the invention it is envisaged allowing the cylindrical magnet 2 with the sheath 3 fitted onto it to interfere such that the banding exerts inwardly directed pressures on the magnet.

The magnetic material is thus greatly compressed in the "rest" condition; at the nominal speed the centrifugal force opposes the compressive forces imparted by the banding, producing a resultant force at the magnet/carbon fiber interface which continues to keep the magnet compressed, thereby avoiding tensile forces incompatible with the sintered material.

This solves the problems associated with the fact of not being able to provide the carbon fiber with the necessary tension for opposing the tensile (centrifugal) forces and allows the sintered material to work in a permanent pressure situation.

Advantageously, during heating, between the banding and the magnetic material of the rotor, compressive forces are produced such as to be greater than those which can be produced by winding the carbon fiber yarn using known technologies at room temperature.

As a result of the invention described it is possible to mount, by means of thermal interference (namely by making use of the different thermal expansion coefficients of the carbon fiber and magnet), the carbon-fiber banding (already wound and fixed using special resins) on the magnetic rotor made of sintered material; this operation solves the problems associated with the fact of not being able to provide the carbon fiber with the necessary tension for opposing the tensile (centrifugal) forces and allows the sintered material to work in a permanent pressure situation.

The invention as described makes use of the different thermal expansion coefficients of the carbon fiber, iron and magnet as well as the good tensile strength of the carbon fiber and the good compressive strength of the sintered magnet.

The invention claimed is:

1. A method of manufacturing a rotor for an electric motor, the method comprising:
   providing a magnet of sintered magnetic material, the magnet having a first diameter;
   forming a radial holding sheath of composite material, the forming including winding at least one carbon filament around a chuck to form a wound carbon filament arrangement that is fixed in position by a layer of resin and has an inner diameter that is smaller than the first diameter;
   reducing the first diameter of the magnet to a second diameter;
   fitting the sheath onto the magnet concurrently with the magnet having the second diameter and the sheath being at room temperature; and
   letting the magnet with the sheath fitted thereon to interfere, thus allowing the sheath to exert inward pressure on the magnet.

2. The method of claim 1, wherein the reducing the first diameter of the magnet comprises:
   lowering a temperature of the magnet.

3. The method of claim 2, wherein the lowering the temperature of the magnet comprises:
   dipping the magnet into fluid at low temperature.

4. The method of claim 3, wherein the low temperature is a temperature lower than about −120° C.

5. The method of claim 3, wherein the fluid is liquid nitrogen.

6. The method of claim 3, wherein the low temperature is a temperature lower than −120° C.

7. The method of claim 3, wherein the low temperature is a temperature lower than −150° C.

8. The method of claim 3, wherein the fluid comprises liquid nitrogen.

9. The method of claim 1, wherein the fitting the sheath onto the magnet is carried out substantially without mechanical interference.

10. The method of claim 1, wherein the letting the magnet with the sheath fitted thereon to interfere comprises:
    heating the magnet and the sheath fitted thereon at room temperature.

11. The method of claim 1, wherein the providing the radial holding sheath of the composite material comprises:
    forming the sheath on a chuck and taking the sheath off the chuck.

12. The method of claim 1, wherein the reducing the first diameter of the magnet comprises:
    lowering a temperature of the magnet using fluid at low temperature.

13. The method of claim 12, wherein the low temperature is a temperature lower than −120° C.

14. The method of claim 12, wherein the low temperature is a temperature lower than −150° C.

15. The method of claim 12, wherein the fluid comprises liquid nitrogen.

16. The method of claim 1, wherein the fitting the sheath onto the magnet is carried out without mechanical interference.

17. The method of claim 1, wherein the fitting the sheath onto the magnet is carried out with very low interference.

18. The method of claim 1, wherein the letting the magnet with the sheath fitted thereon to interfere comprises:
    heating the magnet and the sheath fitted thereon to room temperature.

* * * * *

UNITED STATES PATENT AND TRADEMARK OFFICE
CERTIFICATE OF CORRECTION

PATENT NO.       : 9,641,030 B2
APPLICATION NO.  : 14/031681
DATED            : May 2, 2017
INVENTOR(S)      : Davide Bettoni Page 1 of 1

It is certified that error appears in the above-identified patent and that said Letters Patent is hereby corrected as shown below:

(73) Assignee: IFP ENERGIES NOUVELLE3
Should read:
(73) Assignee: IFP ENERGIES NOUVELLES

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*